United States Patent [19]
Yang

[11] Patent Number: 5,949,500
[45] Date of Patent: Sep. 7, 1999

[54] DEGAUSSING COIL FIXING TECHNIQUE

[75] Inventor: Dong-Wook Yang, Suwon, Rep. of Korea

[73] Assignee: SamSung Electronics Co., Ltd., Suwon, Rep. of Korea

[21] Appl. No.: 08/805,335

[22] Filed: Feb. 24, 1997

[30]     Foreign Application Priority Data

Feb. 24, 1996 [KR] Rep. of Korea ......................... 96-4536

[51] Int. Cl.⁶ ................................................. H04N 5/645
[52] U.S. Cl. ............................................ 348/825; 348/826
[58] Field of Search ............................ 348/82.5, 826–831

[56]                 References Cited

U.S. PATENT DOCUMENTS

| | | | |
|---|---|---|---|
| 3,322,998 | 5/1967 | Norley | 315/8 |
| 3,872,347 | 3/1975 | Matsushima et al. | 315/8 |
| 3,965,386 | 6/1976 | Duistermaat et al. | 315/8 |
| 4,643,493 | 2/1987 | Sides, Sr. et al. | 312/7.2 |
| 4,700,260 | 10/1987 | Craig et al. | 361/150 |
| 4,812,946 | 3/1989 | Prigent et al. | 361/150 |
| 5,036,577 | 8/1991 | Swank | 29/446 |
| 5,038,078 | 8/1991 | Duggan | 315/8 |
| 5,040,752 | 8/1991 | Morrison | 248/71 |
| 5,230,257 | 7/1993 | Nowak | 74/502.4 |
| 5,379,117 | 1/1995 | Ynag | 358/400 |
| 5,416,595 | 5/1995 | Wield | 348/825 |

*Primary Examiner*—Thomas D. Lee
*Assistant Examiner*—Stephen Brinich
*Attorney, Agent, or Firm*—Robert E. Bushnell, Esq.

[57]                 ABSTRACT

A degaussing coil fixing technique in which, after inserting four shaping holders into a frame of a monitor, shaping a degaussing coil by the shaping holders and fixing the frame are simultaneously carried out while the frame is fixed onto a front cover by putting the degaussing coil on an electron tube. The shaping holder includes a seating part with an elastic force for fixing the degaussing coil by being bent to have a radius which is set to be integrally formed with a holder body of the shaping holder assembled to the frame in a body, and a hooking plate extending from a free end of the seating part for smoothly catching the degaussing coil to guide it to the seating part when assembling the frame and a front cover.

4 Claims, 3 Drawing Sheets

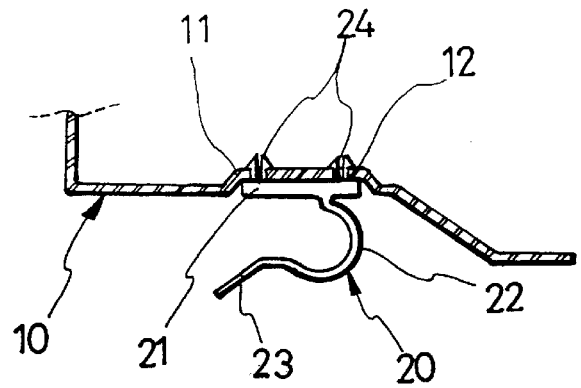
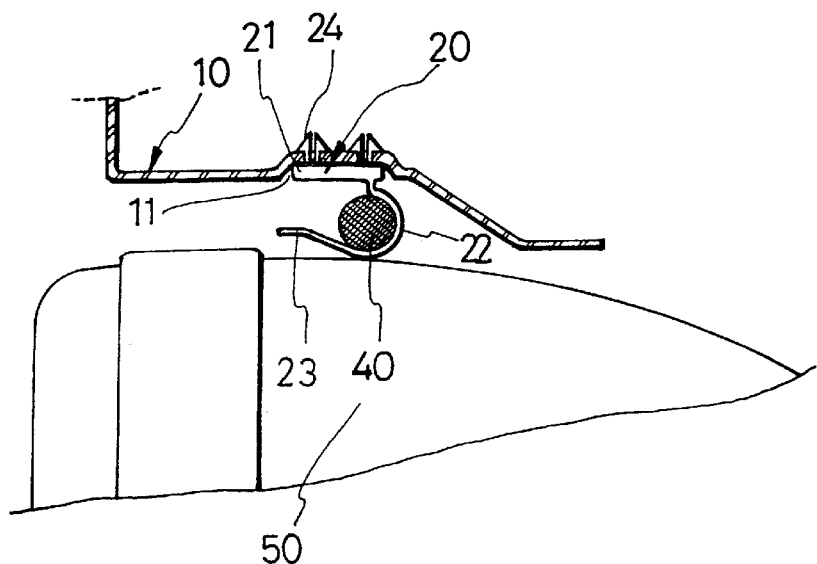
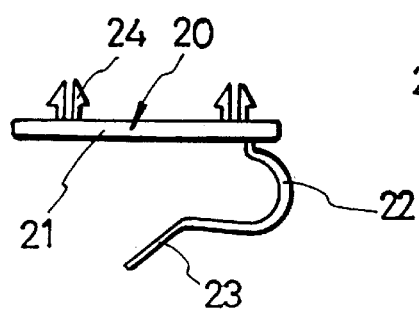
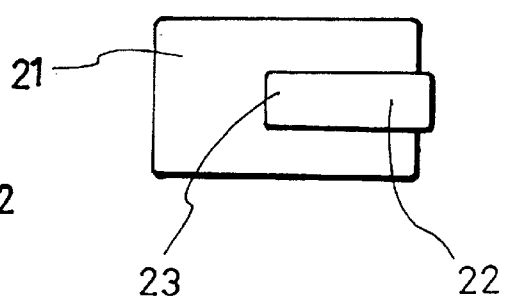

DEGAUSSING COIL FIXING TECHNIQUE

CLAIM OF PRIORITY

This application makes reference to, incorporates the same herein, and claims all benefits accruing under 35 U.S.C. §119 from an application for DEGAUSSING COIL FIXING APPARATUS OF A MONITOR AND A METHOD THEREFOR earlier filed in the Korean Industrial Property Office on Feb. 24, 1996 and there duly assigned Ser. No. 4536/1996.

BACKGROUND OF THE INVENTION

1. Field of the Invention

The present invention relates to a degaussing coil of a monitor, and more particularly to a degaussing coil fixing technique, wherein, after performing a primary preparatory operation of just inserting four shaping holders into a frame of the monitor, the operations of shaping a degaussing coil by means of the degaussing holders and of fixing the frame are simultaneously carried out while the frame is fixed onto a front cover by putting the degaussing coil on an electron tube, thereby improving workability and reducing the number of workers needed for assembly of the monitor.

2. Description of the Related Art

In an earlier monitor, holders are provided for fixing a degaussing coil to a frame of the monitor in advance and the degaussing coil is inserted so as to be seated in the holders and the frame is affixed to a front cover.

That is, the holders are fitted into the frame of the monitor and the degaussing coil is inserted into the holders which are affixed to the frame and the frame fitted with the degaussing coil is then fixed to the front cover which is mounted to an electron tube.

Consequently, the assembly operation is difficult due to the three step assembly operation to result in reduced working efficiency and productivity efficiency. In addition, the number of workers required for the operation is increased, thereby increasing the labor cost.

The following patents each disclose features in common with the present invention, but do not disclose the specifically recited elements of the present invention: U.S. Pat. No. 5,416,595 to Wield, entitled Methods And Apparatus For Securing A Degaussing Coil, U.S. Pat. No. 5,379,117 to Yang, entitled Supporting Member For A VLMF Coil, U.S. Pat. No. 5,038,078 to Duggan, entitled Degaussing Coil Attachment Arrangement, U.S. Pat. No. 4,812,946 to Prigent et al., entitled Demagnetization And Earthing Device For A Picture Aube And Machine For Manufacturing Same, U.S. Pat. No. 4,700,260 to Craig et al., entitled Degaussing Coil And Ground Strap Mounting Arrangement, U.S. Pat. No. 3,965,386 to Duistermaat et al., entitled Degaussing Device For A Color Television Display Tube, U.S. Pat. No. 3,872,347 to Matsushima et al, entitled Degaussing Device For Color Cathode Ray Tubes, U.S. Pat. No. 3,322,998 to Norley, entitled Color Purity Correcting Apparatus For Colored Television Picture Tubes, U.S. Pat. No. 5,040,752 to Morrison, entitled Wire Management Clip, and U.S. Pat. No. 5,230,257 to Nowak, entitled Remote Control Assembly With Snap-In Terminal.

SUMMARY OF THE INVENTION

The present invention is devised to solve the foregoing problems. Therefore, it is an object of the present invention to provide a degaussing coil fixing apparatus of a monitor and method therefor, wherein, after performing a primary preparing operation of just inserting four shaping holders into a frame of the monitor, the operations of shaping a degaussing coil by means of the degaussing holders and of fixing the frame are simultaneously carried out while the frame is fixed onto a front cover by putting the degaussing coil on an electron tube, thereby improving workability and reducing the number of workers needed to assemble the monitor.

To achieve the above object of the present invention, a degaussing coil fixing apparatus of a monitor basically includes a seating part with an elastic force for fixing a degaussing coil by being bent to have a radius which is set to be integrally formed with a holder body of a shaping holder assembled to a frame in a body, and a hooking plate extending from a free end of the seating part for smoothly catching the degaussing coil to guide it to the seating part when assembling the frame to a front cover.

Here, an assembling fixing unit of the frame and the shaping holder is provided such that the frame includes a holder seating groove disposed at a set place of the frame, and a holder assembling hole formed into the holder seating groove. Also, the holder includes the holder body seated onto the holder seating groove for setting the assembling position of the holder, and a holder fixing snap integrally formed to project from the holder body for being inserted into the holder assembling hole to be assembled in a body.

Preferably, a hooking plate of the shaping holder is inwardly bent for smoothly catching the degaussing coil.

To achieve the above object of the present invention, there is provided a degaussing coil fixing method of a monitor which is performed by assembling shaping holders to inner sides of a frame, and coupling the frame to a front cover coupled to an electron tube to which a degaussing coil is arranged. The fixing of the frame and degaussing coil are simultaneously carried out.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 4 is an enlarged view, with portions broken away of an assembling part of the shaping holder according to the present invention;

FIG. 5 is an enlarged view, with portions broken away showing the fixing of the degaussing coil according to the present invention; and FIGS. 6A and 6B are a side view and a bottom end view, respectively, with portions broken away of the shaping holder according to the present invention.

DETAILED DESCRIPTION OF THE PREFERRED EMBODIMENT

Figure 1:
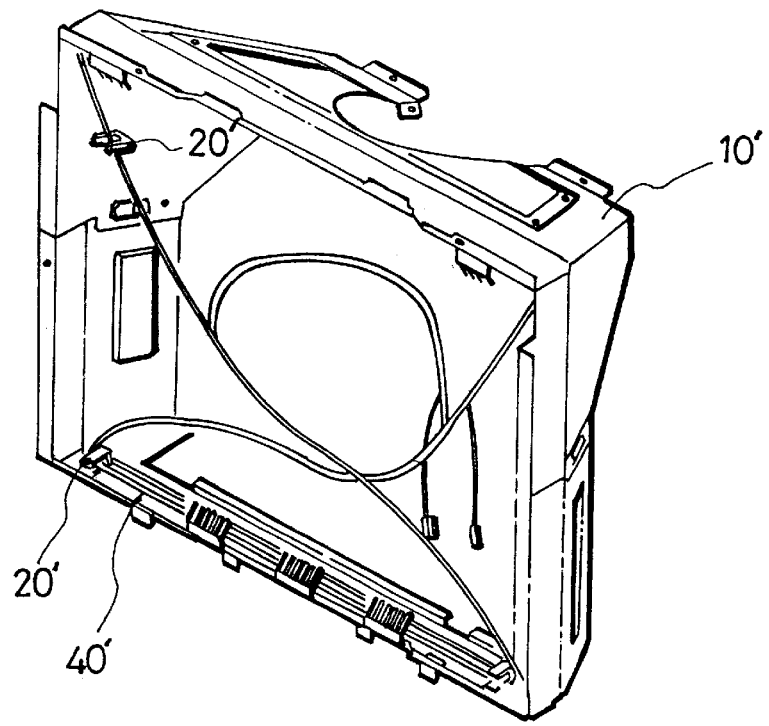
FIG. 1 is a perspective view of a frame showing the fixing of an earlier degaussing coil.
Figure 2:
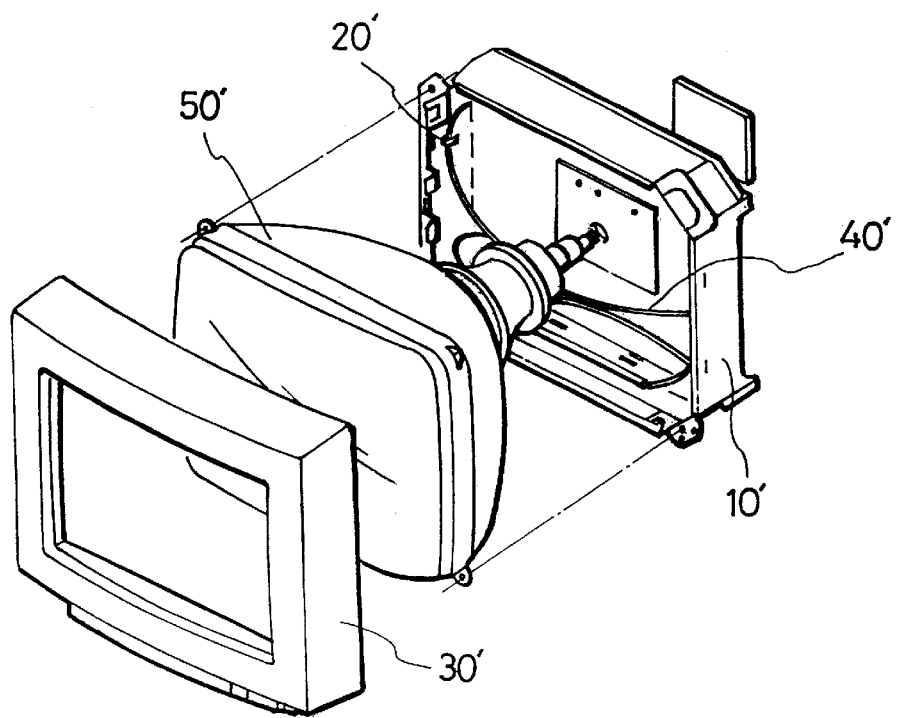
FIG. 2 is an exploded perspective view showing an assembling process of an earlier monitor.

An assembling unit of an earlier monitor, as shown in FIGS. 1 and 2, is provided such that holders 20' for fixing a degaussing coil 40' are fitted to be fixed to a frame 10' of the monitor in advance, and degaussing coil 40' is inserted so as to be seated in holders 20', thereby assembling frame 10' to a front cover 30'.

That is, holders 20' are fitted into the frame 10' of the monitor to complete the primary operation. Then, degaussing coil 40' is secondarily inserted into holders 20' which are assembled to frame 10'. Finally, frame 10' fitted with degaussing coil 40' is fixed to front cover 30' which is mounted to an electron tube 50'.

Consequently, the assembling operation becomes difficult due to performing the operation three times to result in reduced working efficiency and productivity efficiency. In addition, the number of workers required for the preparing operation is increased to have a disadvantage of increasing labor cost.

A degaussing coil fixing apparatus of a monitor and method therefor according to the present invention will be described in detail with reference to the preferred embodiment shown in FIGS. 3 to 6B.

As shown in FIGS. 3 to 6B, the degaussing coil fixing apparatus of the monitor is constructed in such a manner that a seating part 22 with an elastic force is bent for fixing the degaussing coil by having a radius set to be integrally formed with a holder body 21 of a shaping holder 20 which is integrally assembled to a frame 10. Also, a hooking plate 23 extending from the free end of seating part 22 upwardly catches a degaussing coil 40 to guide it to the seating part 22 when assembling the frame 10 and a front cover 30.

In connection with an assembling fixing unit of frame 10 and shaping holder 20, the frame 10 includes a holder seating groove 11 disposed at a preset place thereof and a holder assembling hole 12 formed into holder seating groove 11. Additionally, the holder 20 includes a holder body 21 seated onto holder seating groove 11 for setting the assembling position, and a holder fixing snap 24, integrally formed to protrude from the holder body 21, is inserted into holder assembling hole 12 to be integrally assembled therewith.

In the present embodiment, two holder fixing snaps 24 project at two places to inhibit the movement of the holder 20.

The hooking plate 23 of the holder 20 is inwardly bent to slant to smoothly catch the degaussing coil 40.

The front cover 30 is assembled with the electron tube 50 in such a manner that fixing plates 51 integrally formed at respective corners of the electron tube 50 are correspondent to front tube fixing bosses 31 which protrude from the inner side of respective corners of the front cover 30, and separate assembling screws 60 are employed to assemble the front cover 30 and electron tube 50 in a body.

An assembling unit of frame 10 and front cover 30 forces respective assembling holes 13 formed along the outer flange of frame 10 to correspond to respective frame fixing bosses 32 projecting from respective inner sides of front cover 30, and separate assembling screws (not shown) are employed to execute the assembling.

Figure 3:
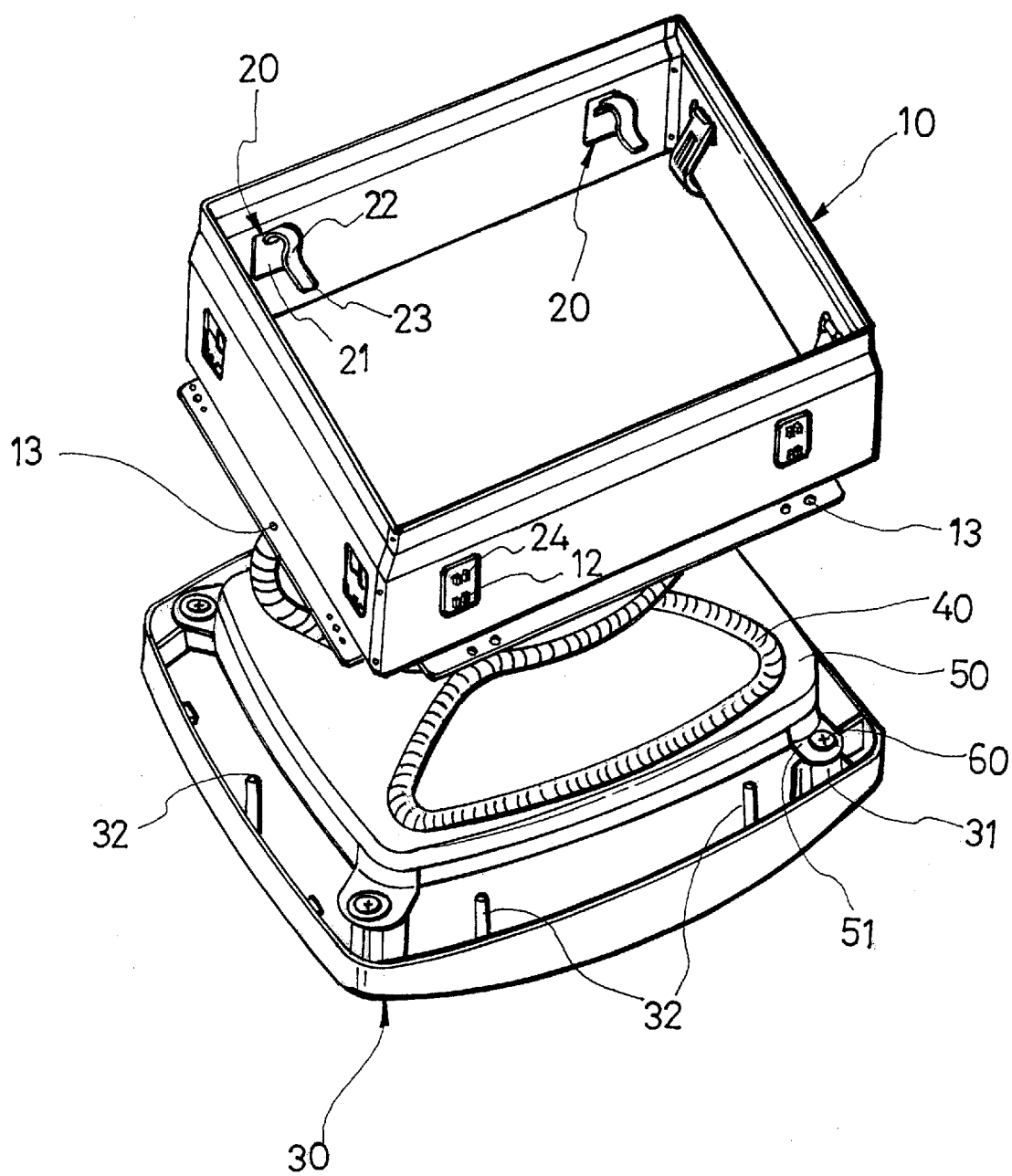
FIG. 3 is an exploded perspective view showing an assembling process of a monitor according to the present invention.

Referring to FIGS. 3 and 4, the primary assembling is performed under the state that the frame 10 of the monitor is prepared. That is, once the holder fixing snaps 24 of shaping holder 20 are inserted into the holder assembling holes 12 of the frame 10, the holder body 21 is seated onto the holder seating groove 11 of frame 10 to set the assembling position and, at the same time, corresponds to the plane of the frame 10 so as not to obstruct the guiding insertion of the degaussing coil 40.

The holder fixing snaps 24 of the shaping holder 20 are constricted in the typical way when frame 10 is fitted through the holder assembling holes 12. Then, upon passing the holder assembling holes 12, the holder fixing snaps 24 catch the plane of the frame 10 to block the separation of frame 10 unless an external force is applied thereon while the hooking jaw is elastically widened in the radial direction. Therefore, the primary assembling work of assembling shaping holder 20 to frame 10 is completed.

FIG. 3 shows a secondary assembling process according to the present invention, in which degaussing coil 40 is arranged to the fixing position at the upper portion of electron tube 50 integrally assembled to front cover 30, and frame 10 are put on front cover 30. Then, respective shaping holders 20 assembled to frame 10 is placed to the straight upper portion of degaussing coil 40.

Thereafter, assembling holes 13 of frame 10 are fitted to be coupled with the frame fixing bosses 32 of the front cover 30 by means of the assembling screws, so that hooking plates 23 smoothly catch the degaussing coil 40.

In other words, as soon as frame 10 is put on the front cover 30 as shown in FIG. 4, the hooking plates 23 of respective shaping holders 20 assembled to frame 10 are in contact with the outer plane of the electron tube 50 to be bent to the assembling position as shown in FIG. 5. Thus, seating parts 22 are elastically bent and, simultaneously, are deformed to have an angle which is favorable for hooking plates 23 to catch degaussing coil 40. By doing so, the degaussing coil 40 is caught by the hooking plates 23 to be guided to the seating parts 22.

The guiding of degaussing coil 40 to the seating part 22 means that the seating part 22 is guided toward degaussing coil 40, and the fixing is smoothly carried out the moment degaussing coil 40 is guided to the seating part 22.

The holder body 21 which is embedded into the holder seating groove 11 of the frame 10 to correspond to the plane of the frame 10 does not impede the guiding of the degaussing coil 40.

Accordingly, when assembling the frame 10 and the front cover 30, the degaussing coil 40 is smoothly fixed to shaping holders 20 to be able to shorten the assembling operation.

As a result, in the present invention, the primary assembling operation of inserting the shaping holders into the four inner sides of the frame of the monitor is performed in advance, and the secondary assembling operation of fixing the frame into the front cover is performed while the degaussing coil is just put on the electron tube. Then, the operations of shaping the degaussing coil by the degaussing coil holders and fixing the frame can be simultaneously carried out to enhance both operation efficiency and productivity efficiency. Furthermore, the number of workers is reduced to be effective in reducing labor cost.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A degaussing coil fixing apparatus of a monitor, comprising:

a seating part with an elastic force for fixing a degaussing coil by being bent to have a radius which is set to be integrally formed with a holder body of a shaping holder assembled to a frame in a body; and a hooking plate extending from a free end of said seating part for smoothly catching said degaussing coil upward to guide it to said seating part when assembling said frame to a front cover.

2. A degaussing coil fixing apparatus of a monitor as claimed in claim 1, further comprising jig for said frame and said shaping holder comprising:

a holder seating groove disposed at a set place of said frame, said holder seating groove having a holder assembling aperture disposed therein; and said holder body seated onto said holder seating groove for setting the assembling position of said holder, and a holder fixing snap integrally formed to project from said holder body for being inserted into said holder assembling aperture to be assembled in a body.

3. A degaussing coil fixing method, comprising:

assembling shaping holders to inner sides of a frame; and coupling said frame to a front cover coupled with an electron tube to which a degaussing coil is arranged, the fixing of said frame and degaussing coil being simultaneously carried out.

4. A monitor, comprising:

an electron tube for displaying an image;

a front cover affixed to said electron tube;

a frame affixed to said front cover for encircling an exterior of said electron tube; and a seating part affixed to inner sides of said frame for fixing a degaussing coil, said seating part comprising a hooking plate for catching said degaussing coil when affixing said frame to said front cover so as to guide said degaussing coil to said seating part.

* * * * *